(12) United States Patent
Yap et al.

(10) Patent No.: US 8,363,827 B2
(45) Date of Patent: Jan. 29, 2013

(54) METHOD AND APPARATUS FOR GENERIC MULTI-STAGE NESTED HASH PROCESSING

(75) Inventors: Kirk S. Yap, Framingham, MA (US); Stephanie L. Hirnak, Bedford, NH (US); Daniel G. Borkowski, Lunenburg, MA (US)

(73) Assignee: Intel Corporation, Santa Clara, CA (US)

( * ) Notice: Subject to any disclaimer, the term of this patent is extended or adjusted under 35 U.S.C. 154(b) by 699 days.

(21) Appl. No.: 11/949,767

(22) Filed: Dec. 3, 2007

(65) Prior Publication Data

US 2009/0141887 A1 Jun. 4, 2009

(51) Int. Cl.
*H04K 1/00* (2006.01)
(52) U.S. Cl. .......................................... 380/28
(58) Field of Classification Search .................... 380/28, 380/44, 45; 713/165, 166, 180
See application file for complete search history.

(56) References Cited

U.S. PATENT DOCUMENTS

| 4,538,240 A | 8/1985 | Carter et al. |
| 6,842,860 B1 * | 1/2005 | Branstad et al. ............... 713/170 |
| 2002/0001384 A1 * | 1/2002 | Buer et al. ....................... 380/30 |

FOREIGN PATENT DOCUMENTS

| JP | 2000-206878 A | 7/2000 |
| JP | 2002-162904 A | 6/2002 |
| KR | 10-2005-0065976 A | 6/2005 |
| WO | 2009/073365 A2 | 6/2009 |
| WO | 2009/073365 A3 | 7/2009 |

OTHER PUBLICATIONS

International Preliminary Report on Patentability and Written Opinion received for PCT Application No. PCT/US2008/083985, mailed on Jun. 17, 2010, 5 pages.
Alan O. Freier et al., "The SSL Protocol, Version 3.0", Nov. 18, 1996, Internet-Draft, 62 pages, http://wp.netscape.com/eng/ssl3/draft302.txt.
H. Krawczyk et al., "HMAC: Keyed-Hashing for Message Authentication", RFC 2104, Feb. 1997, 11 pages, http://www.ietf.org/rfc/rfc2104.txt?number=2104.
T. Dierks et al."The TLS Protocol Version 1.0", RFC 2246, Jan. 1999, 75 pages, http://www.ietf.org/rfc/rfc2246.txt.
International Search Report/Written Opinion for Patent Application No. PCY/US2008/083985, mailed May 29, 2009, 10 pages.

* cited by examiner

*Primary Examiner* — Beemnet Dada
(74) *Attorney, Agent, or Firm* — Grossman, Tucker, Perreault & Pfleger, PLLC

(57) ABSTRACT

A generic multi-stage nested hash unit that provides support for generic, multi-stage nested hashes accelerates a wide range of security algorithms and protocols. The supported security algorithms and protocols include SSL v3 MAC, TLS PRF, and SSL v3 Key Material Generation. The hash unit allows the same code to be used to generate the MAC even when the MAC algorithms are different, for example, for SSL and TLS protocols.

20 Claims, 6 Drawing Sheets

METHOD AND APPARATUS FOR GENERIC MULTI-STAGE NESTED HASH PROCESSING

FIELD

This disclosure relates to performing hash functions and in particular to performing multi-stage nested hash functions.

BACKGROUND

A configurable hash unit may perform a plurality of different hash algorithms such as Message-Digest Algorithm 5 (MD5), Secure Hash Algorithms (for example, SHA-1, SHA-256) on one or more data sets/packets. Typically, prior to processing each data set/packet, the hash unit is configured with initial parameters for the particular hash algorithm. The data set/packet is forwarded to the hash unit for processing and the hash result is read.

Typically, a hash unit operates in a "pipelined" fashion to maximize the throughput performance of the hash unit. In a pipelined operation, one portion of the data set/packet, for example, one block is processed by the hash unit while additional portions of the data set/packet are being loaded into the hash unit. Typically, many blocks of data and configuration commands may be pre-loaded. The pre-loading of the data and configuration commands allows the next data set/packet to be 'staged' while the current packet is being processed.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
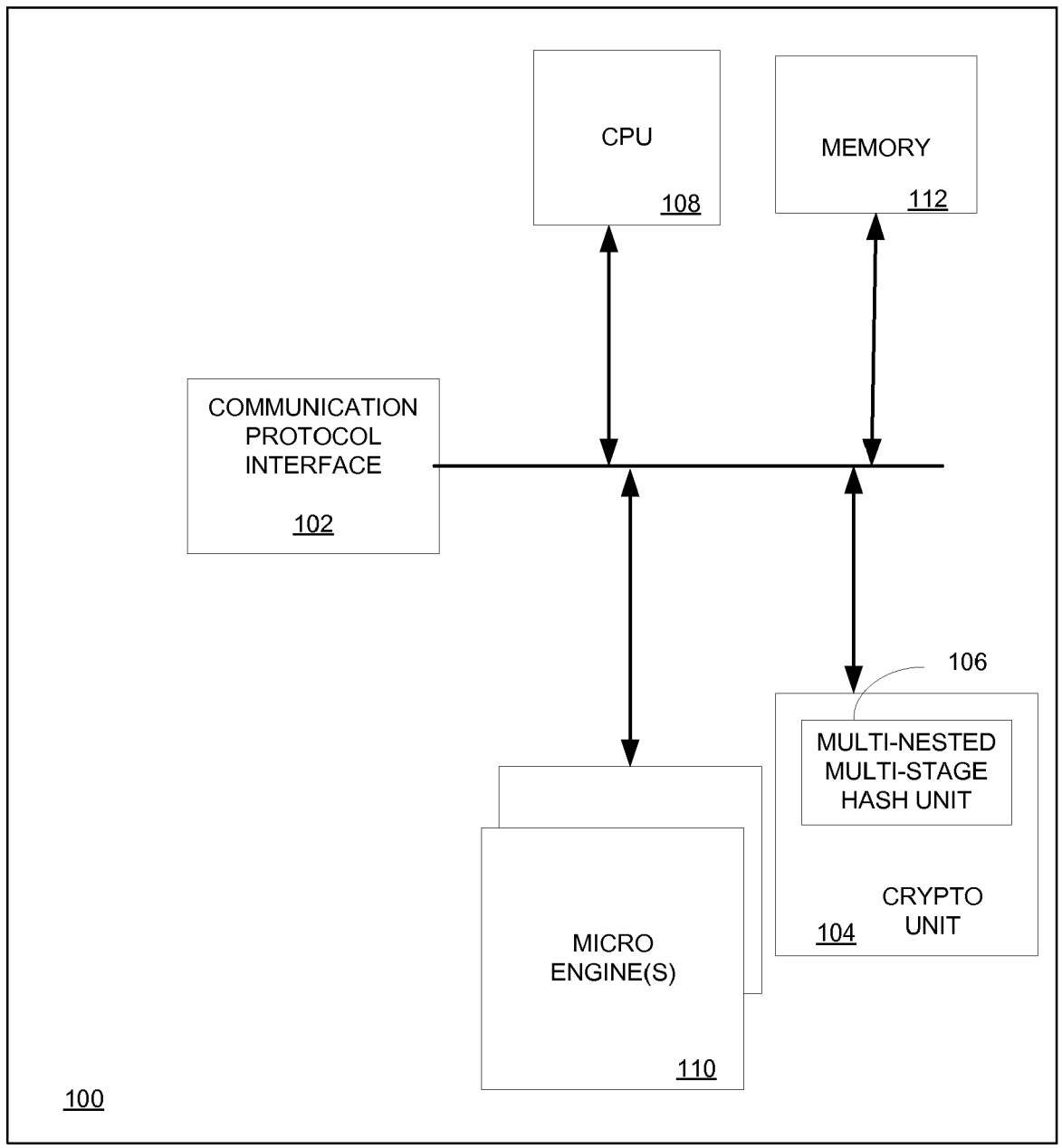
FIG. 1 is a block diagram of an embodiment of a network processor that includes an embodiment of a generic multi-stage, nested hash unit according to the principles of the present invention.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

There are hash algorithms that perform two or more hash functions on the same data set (packet). Typically, the first hash function is performed on the data that is input to the hash algorithm, and the second hash function is performed on the result of the first hash function. In some hash algorithms, the input data to the second hash function may include other data in addition to the result of the first hash function. The standard Keyed-Hash Message Authentication Code (HMAC) algorithm (Internet Engineering Task Force (IETF) Request For Comments (RFC)-2104) (now Federal Information Processing Standards (FIPS-198)) is an example of such a hash algorithm. This type of hash algorithm may be referred to as a "two-stage nested hash". In the HMAC algorithm the first hash function and the second hash function are the same basic hash algorithm, for example, the first and second hash function may both be Message-Digest Algorithm 5 (MD5) or Secure Hash Algorithms (SHA)-1.

The HMAC algorithm performs the following hash functions (H) over the data 'text' which has a fixed block size, for example, 64 bytes:

$$H(K \text{ XOR opad}, H(K \text{ XOR ipad}, \text{text}))$$

where:
  H is a cryptographic hash function where data is hashed by iterating a basic compression function on blocks of data;
  K is a secret key;
  XOR is an Exclusive OR operation;
  ipad is a fixed string of B bytes with value 0x36; and
  opad is a fixed string of B bytes with value 0x5C. The 'i' and 'o' are mnemonics for inner and outer.

As shown above, the HMAC algorithm is a two-stage nested hash function, that is, it includes an inner hash function H(K XOR ipad, text) and an outer hash function H(K XOR opad, H(K XOR ipad, text). The outer hash function uses the result of the inner hash function.

If the hash unit operates in a pipeline fashion, there is a pipeline 'stall' if a next data set has a dependency on the result of a current data set. Thus, for example, when using the HMAC algorithm, a next data set cannot be 'staged' until the current data set is completely processed. As the HMAC algorithm is a widely-used standard hashing algorithm, most hash unit implementations include dedicated circuitry to accelerate the HMAC algorithm. This dedicated circuitry is specifically designed to only support the HMAC algorithm and is thus limited to using the same hash algorithm for both stages of the two stage nested hash function.

In an embodiment of the present invention, a hash unit includes support for "generic multi-stage, nested hash" function without pipeline stalls. The generic multi-stage, nested hash function allows a nested hash function to be staged, and subsequent data packets (messages or data blocks) may be staged behind it, allowing the hash unit to remain busy. In addition to supporting the HMAC algorithm, the generic multi-stage, nested hash function allows hardware acceleration of other security algorithms and protocols, such as Secure Sockets Layer (SSL).

The SSL version 3 protocol defines a nested hash for computation of a Message Authentication Code (MAC). A MAC is a one-way hash computed from a message and some secret data and is used to detect if the message has been altered. A hash is performed on the packet data pre-pended with some protocol data to generate an intermediate result. This is referred to as the 'inner hash function', with the result referred to as the 'inner hash result'. The inner hash result is then pre-pended with some protocol data, and another hash is performed with the result referred to as the 'outer hash result'. The outer hash result is the final SSL v3 MAC value. The inner and outer hash function use the same hash algorithm, either MD5 or SHA-1. However, the nested hash is not the same as the HMAC, thus the "standard HMAC support function" is not usable for this purpose. The MAC is computed in one sequence of commands without stalling the pipeline.

FIG. 1 is a block diagram of an embodiment of a network processor 100 that includes an embodiment of a generic multi-stage, multi-nested hash unit 106 according the principles of the present invention.

The network processor 100 includes a communications protocol interface 102, a processor (Central Processing Unit (CPU)) 108, a plurality of micro engines 110 and a crypto unit 104 that includes an embodiment of a nested hash unit 106 according to the principles of the present invention.

The CPU 108 may be a 32 bit general purpose processor. In an embodiment, each micro engine 110 is a 32-bit processor.

The communications protocol interface 102 buffers network packets as they enter and leave the network processor 100. In one embodiment, the communications protocol interface 102 may include support for the Media Access Control (MAC) protocol with Direct Memory Access (DMA) capability which handles packets as they enter and leave the network processor 100.

The crypto unit 104 offloads work associated with symmetric-key encryption and decryption. The crypto unit also computes message digests, message authentication checks (MACs) and checksums. In an embodiment, the crypto unit 104 may include a memory for storing data to be encrypted and decrypted.

The crypto unit 104 may provide Advanced Encryption Standard (AES) and triple Data Encryption Standard (3DES) symmetric-key ciphers for bulk encryption and decryption, Secure Hash Algorithm (SHA-1) for computing a one-way hash function over input data and Hashed Message Authentication Code (HMAC) for computing a keyed message digest over input data. The SHA-1 includes a nested hash unit for performing a hash function on an input key to map a large input key to a smaller value that may be used as an index to a table. The MAC is computed using a cryptographic hash function (for example, MD5 or SHA-1) in combination with a secret key. An iterative hash function breaks the message (packet) into blocks of fixed size (for example, 512-bits) and iterates over them with a compression function to generate a fixed size (for example, 128 or 160 bits) message digest.

Figure 2:
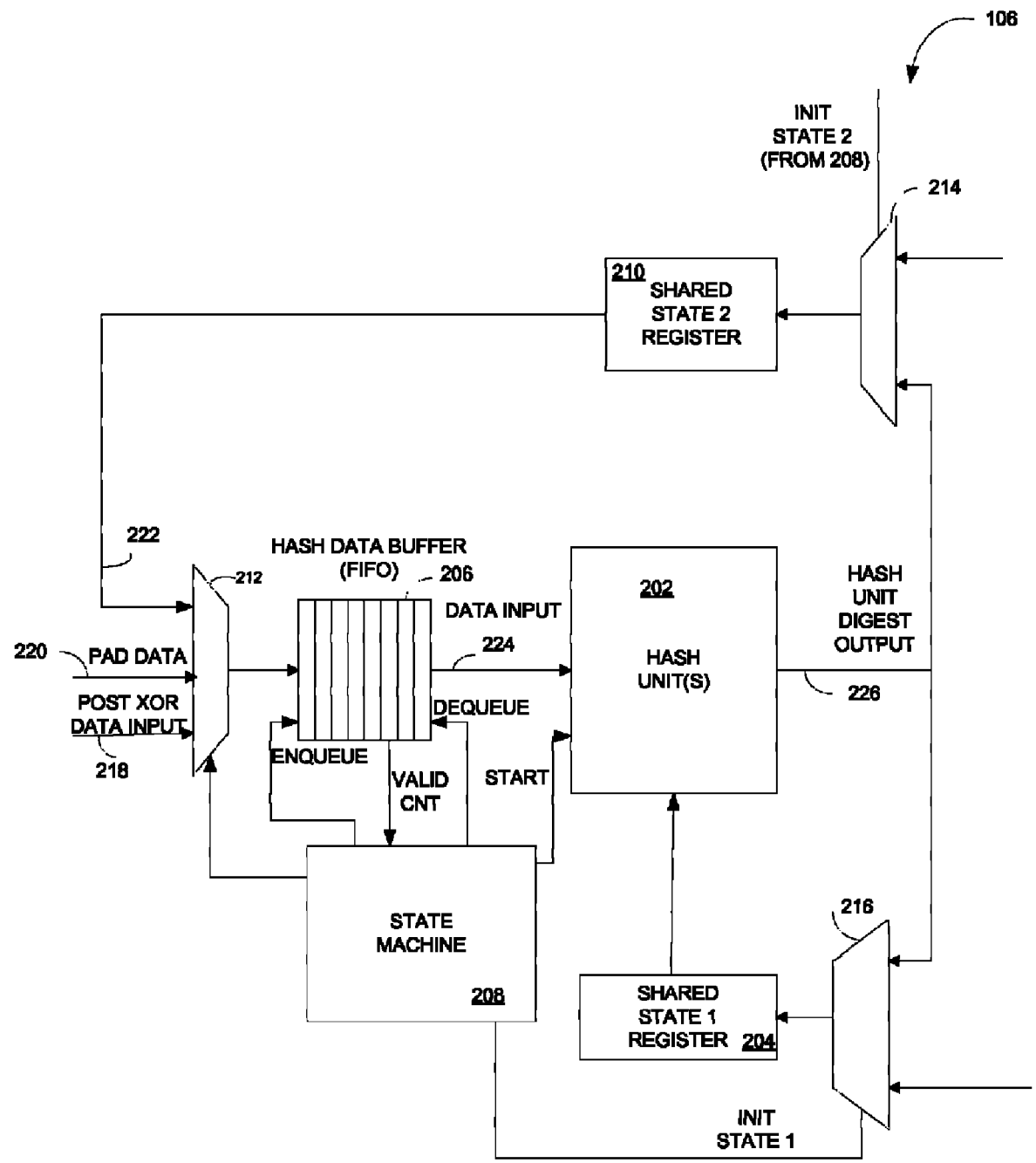
FIG. 2 is a block diagram of an embodiment of the generic multi-stage, nested hash unit shown in FIG. 1.

FIG. 2 is a block diagram of an embodiment of the generic multi-stage, nested hash unit 106 shown in FIG. 1. The multi-stage, nested hash unit 106 includes one or more hash units 202. In an embodiment, there are a plurality of hash units 202 with one hash unit 202 active at any point in time. The multi-stage, nested hash unit 202 also includes a State 1 register 204 with width equal to the digest length of the hash algorithm, a State 2 register 210 with width equal to the digest length of the hash algorithm, a hash data buffer or First In First Out (FIFO) 206 with size equal to the block size of the hash algorithm and a state machine 208 that controls data movement between state registers 204, 210, hash units 202 and the hash data buffer 206.

The state machine 208 monitors the contents of the hash data buffer 206 through the valid count (valid cnt) signal and enqueues data through the control of the enqueue signal until the valid cnt signal indicates that a block size is stored in the hash data buffer 206. After the hash data buffer 206 receives an amount of data equal to the block size of the selected hash algorithm, the state machine 208 triggers the corresponding hash unit 202 to start the hash processing (using the start signal). In an embodiment, as data is dequeued (read) (using the dequeue control signal) from the hash data buffer 206. MD5 and SHA-1 operate on blocks of 512 bits. The state machine 208 also controls the selection of inputs at multiplexers 212, 216, 214.

The hash unit 202 performs a hash function on the block and outputs a fixed length string that may be referred to as a hash digest (message digest) or digital fingerprint. The size of the hash digest for MD5 and SHA is 128 bits or 160 bits. After completion of the hash function on each block of data by the hash unit 202, the state 1_register 204 is updated with the resulting hash digest 226. If the block of data corresponds to a final_inner or a final outer command, the state_2 register 210 is also updated with the resulting hash digest 226 through multiplexer 214.

Data to be operated on by the generic multi-stage nested hash unit 106 is input to the generic multi-stage, nested hash unit 106 through a 3:1 multiplexer 212. The data may be "Post Exclusive OR (XOR) Data Input" signal 218, pad data 220 or feedback data 222 from the state 2 register 210. The Post XOR data input 218 is the initial data from a data set/packet to be processed. The pad data 220 is received from the padding logic that performs a hash padding algorithm required after sending message data from the state_2 register 210. A feedback path from the state_2 register is enabled when a final_outer command is invoked prior to performing any hash padding.

An embodiment of the nested hash unit 106 enables hardware acceleration of security algorithms and protocols including the HMAC algorithm, SSL v3 protocol MAC computation, Transport Layer Security (TLS) Pseudo-Random Function (PRF), SSL v3 Key-Material Generation Function and "On-the-fly" ipad and opad computation and any other security algorithms or protocols that involve nested hash functions.

The multi-nested hash unit includes a datapath multiplexer 212 at the input of the Hash Data Buffer 206, a connection from the output of the Hash Unit 112 202 to the State 2 register 210, and XOR gates to pre-process the raw data with ipad and opad HMAC constant values.

A generic n-level nested hash function performed by the generic multi-nested hash unit 106 is defined as shown below in Table 1 below:

TABLE 1

$H_n(opad_n, H_{n-1}(opad_{n-1}, ......., H_2(opad_2, H_1(ipad, data))).....)$
where :
ipad: is any length inner pad (ipad) data, for example, B bytes of 36 (Hexidecimal)
$opad_2$-$opad_n$: any length outer pad (opad) data
$H_1$-$H_n$ :- denotes the basic hash function, which can be performed with any of the supported hash algorithms (e.g. MD5, SHA-1), $H_i$ is not necessarily the same as $H_n$ H(A,B) is the hash(H) digest of A concatenated with B.
$H_1$  - is an inner hash function.
$H_2$-$H_n$  - are outer hash functions.
data  - packet data to process.

The operation of the generic multi-stage, multi-nested hash unit will be described for generating keys for a Transport Layer Security (TLS) session in conjunction with FIG. 3.

TLS version 1.0 is a cryptographic protocol that defines a pseudo-random function (PRF), which is used to generate keys for a TLS session. The computation portion of the PRF is the use of a data expansion function (defined in the TLS specification), which is defined in Table 2 below:

TABLE 2

P_hash(secret, seed) = HMAC(secret, A(1) + seed) +
  HMAC(secret, A(2) + seed) +
  HMAC(secret, A(3) + seed) + ...
where:
A(0) = seed, and
A(i) = HMAC(secret, A(i−1))

The '+' sign denotes concatenation.

Figure 3:
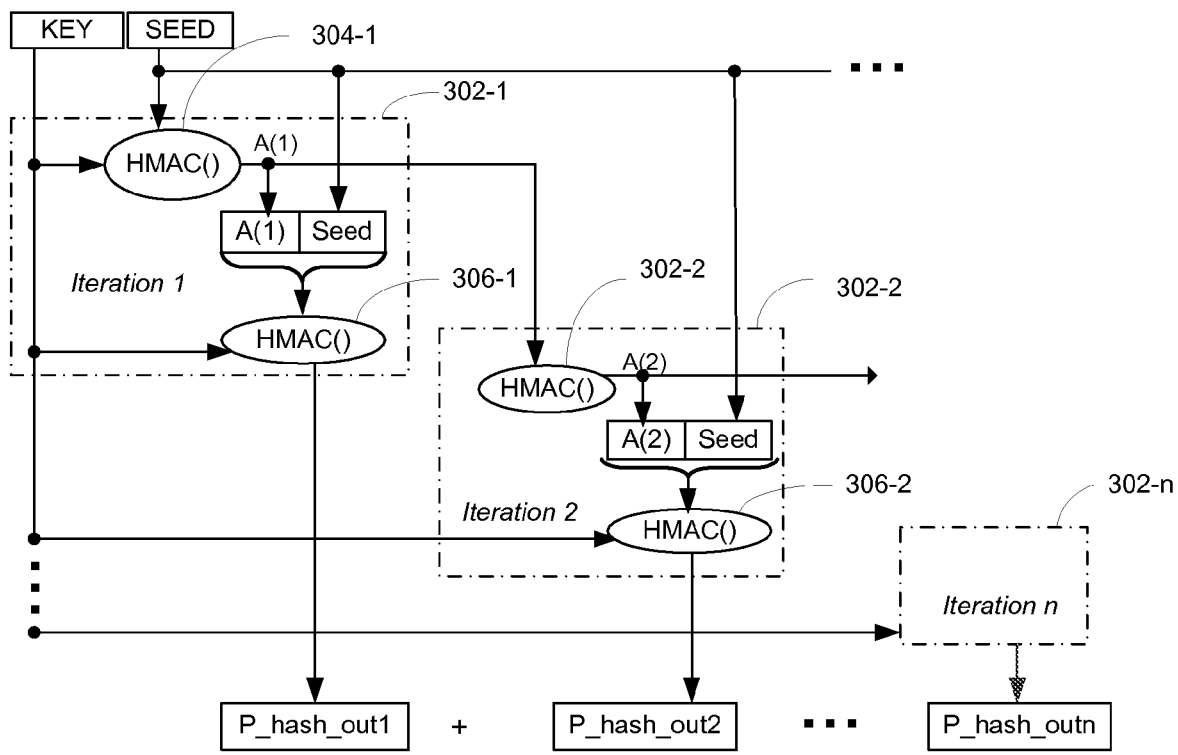
FIG. 3 illustrates iterations of a data expansion function that is used to generate keys for a Transport Layer Security (TLS) session.

FIG. 3 illustrates iterations of a data expansion function that is used to generate keys for a Transport Layer Security (TLS) session. The TLS MAC is defined as a standard HMAC using either SHA-1 or MD5, whereas the SSLv3 MAC is a somewhat-different two-stage nested hash as described above. The MAC computation for SSL and TLS may be performed using the same hash commands which may simplify the software development, testing, and maintenance effort.

As shown in FIG. 3 each iteration 302-1, 302-2, ... 302-n includes two calls to the HMAC function. In an embodiment, the secret may be the key (K) and the seed may be the ipad data. The TLS MAC is defined as a standard HMAC using either SHA-1 or MD5.

Figure 4:
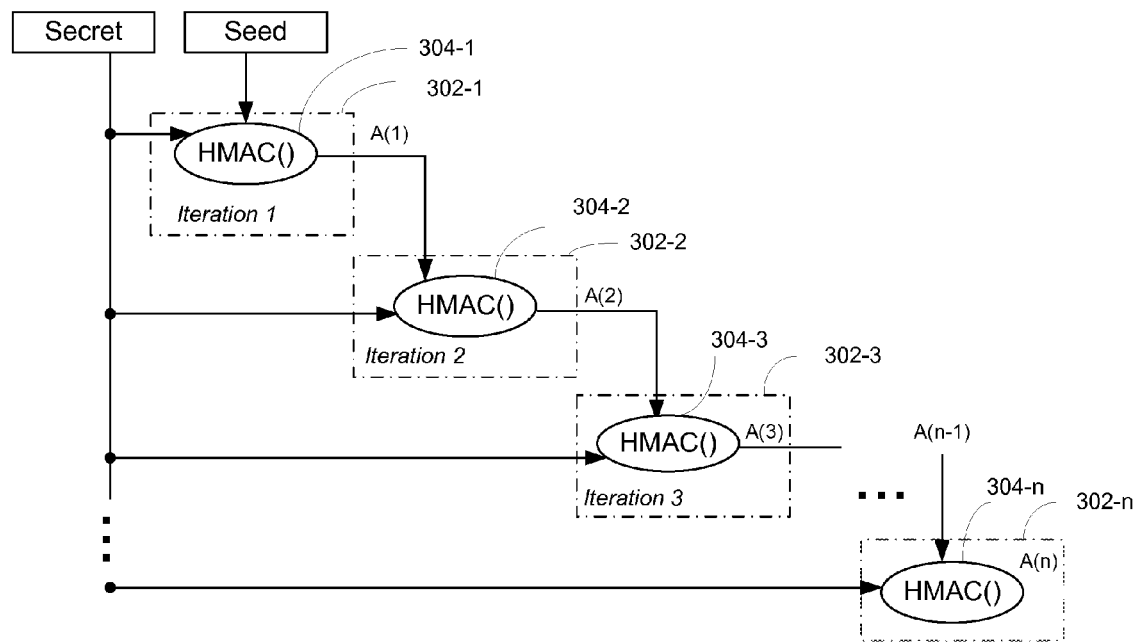
FIG. 4 illustrates Pass 1 of the P_hash function shown in FIG. 3.

Referring to iteration 1 302-1 and Table 2, the HMAC function 304-1 computes A(1)=HMAC (secret, A(0)) and the HMAC function 306-1 computes HMAC(secret, A(1)+seed) to provide P_hash out1. The data expansion function shown above in Table 2 and in FIG. 3 can be broken into a set of nested dependent HMACs, that may be referred to as Pass 1 of the P_hash, and a set of independent HMACs, which may be referred to as Pass 2 of the P_hash. FIG. 4 illustrates Pass 1 of the P_hash function and FIG. 5 illustrates Pass 2 of the P_hash function shown in FIG. 3.

The multi-nested hash unit 100 computes the P_hash in one sequence of commands with Pass 2 commands immediately following Pass 1 commands without stalling the pipeline. Referring to FIG. 4, in pass 1 commands are issued first to perform, HMAC functions 304-1, 304-2, 304-3, ... 304-n in each iteration 302-1, 302-2, 302-3, ... 302-n.

Figure 5:
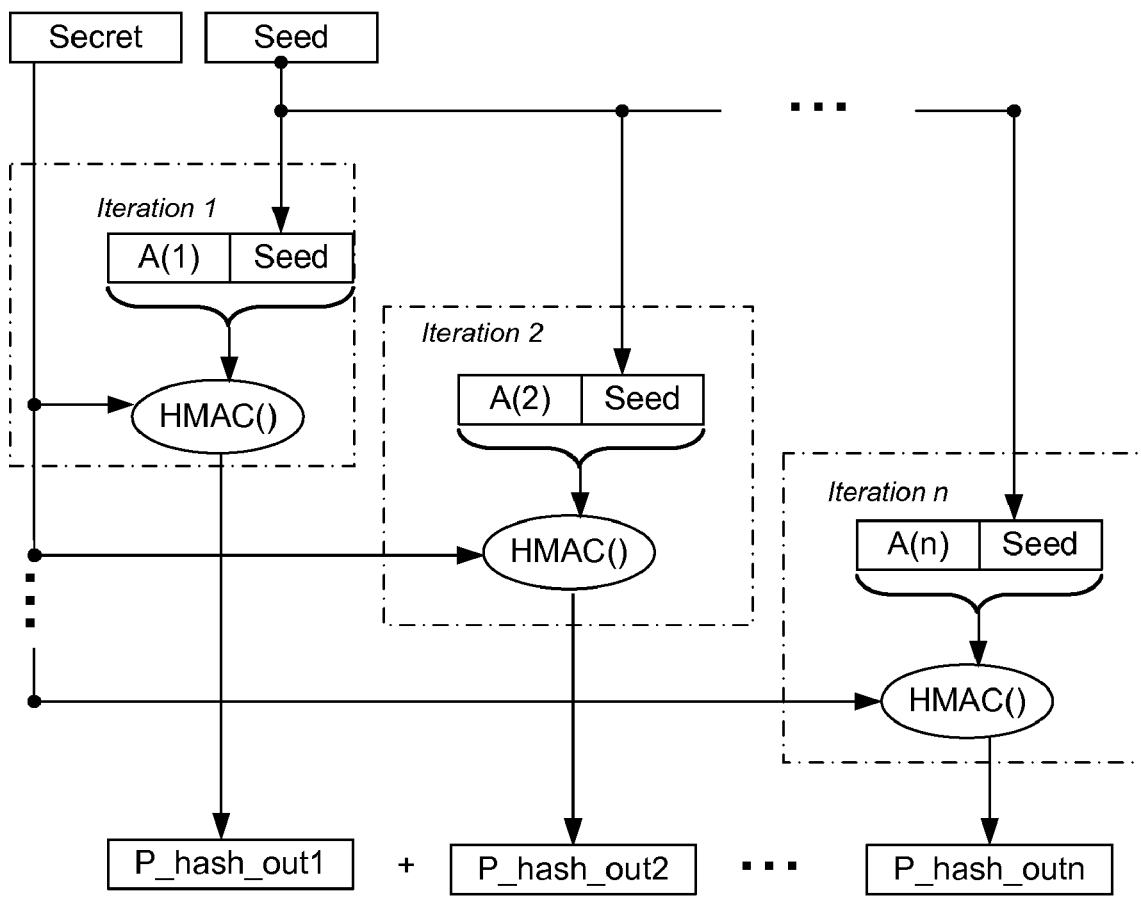
FIG. 5 illustrates Pass 2 of the P_hash function shown in FIG. 3.

Referring to FIG. 5, after commands have been issued to start pass 1, pass 2 commands can be immediately started without having to wait for the pass 1 commands to be completed because commands to a particular block are guaranteed to be executed in order. Thus, as shown in FIG. 5, commands to start HMAC functions 306-1, 306-2, 306-n are issued in each iteration 302-1, 302-2, 302-3, ... 302-n using the result of HMAC functions 304-1, 304-2, 304-3, ... 304-n. The computation of the PRF is completed by calculating the P_hash with MD5, and P_hash with SHA-1, then performing an XOR function on the output of the separate P_hashes.

The pass 1 and pass 2 shown in FIGS. 4 and 5 are enabled through a sequence of commands to control the operation of the generic multi-stage, nested hash unit shown in FIG. 2.

Figure 6:
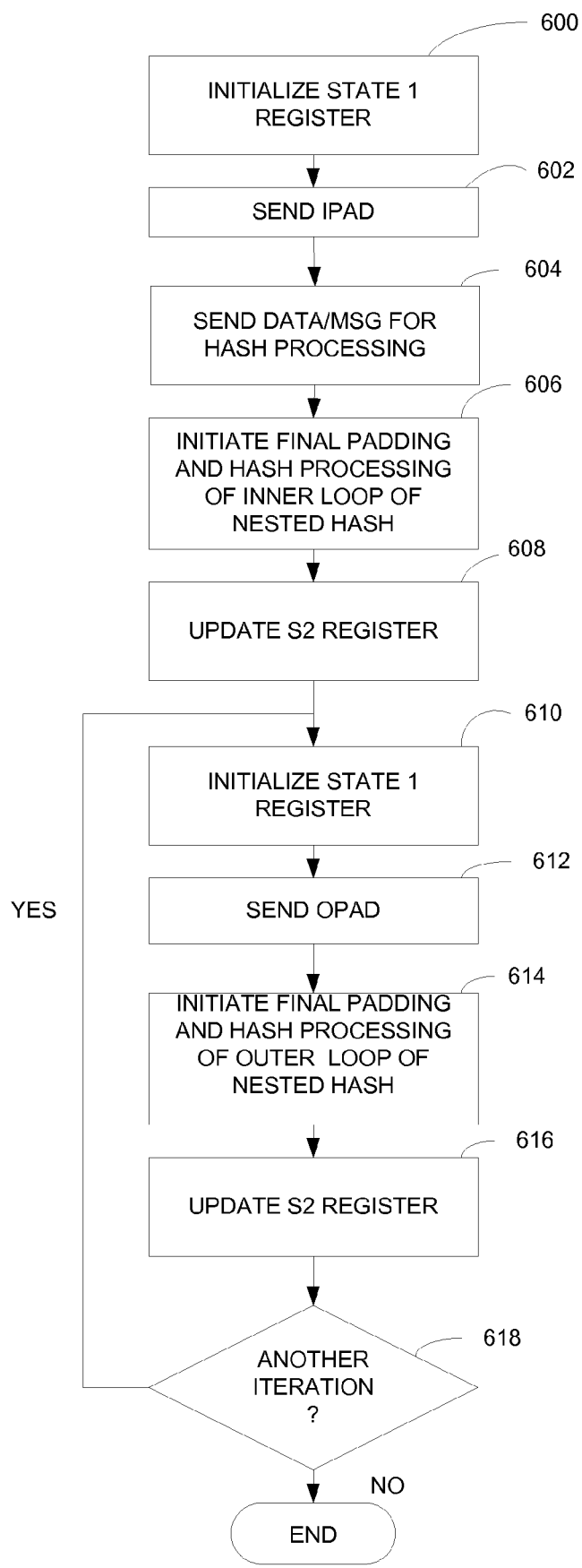
FIG. 6 is a flowgraph illustrating an embodiment of a method for performing an n-level nested hash function according to the principles of the present invention.

FIG. 6 is a flowgraph illustrating a method for performing generic multi-stage nested hash processing in the generic multi-stage multi-nested hash unit shown in FIG. 2. FIG. 6 will be described in conjunction with FIG. 2 and the function shown in Table 1.

At block 600, the multi-stage, multi-nested hash unit 106 is set up for processing the inner loop of the HMAC algorithm shown in Table 3 by initializing the state 1 register 204. The state 1 register 204 is initialized with the starting digest value to be used in this iteration of the hash processing. Processing continues with block 602.

At block 602, the ipad to be used for the inner loop is sent to the generic multi-stage multi-nesting hash unit. Processing continues with block 604.

At block 604, a data set (message or block of data or packet data) is sent to the generic multi-stage multi-nested hash unit for processing through multiplexer 212 and is stored in the hash data buffer (FIFO) 206. The data arrives on post XOR data 218 at the input of multiplexer 212. Processing continues with block 606.

At block 606, the state machine 208 initiates final padding and hash processing of the inner loop of the nested hash by appropriate selection of the input of multiplexer 212 to allow pad data 220 through to the hash Data FIFO buffer. Processing continues with block 608.

At block 608, the S2 register is updated with the hash unit digest output from the inner loop. Processing continues with block 610.

At block 610, the state 1 register is initialized with the hash unit digest output from the inner loop which will be used by the outer loop(s). The state of the init state 1 control signal to multiplexer 216 is set to allow the hash unit digest output 226 to be stored in the shared state 1 register 204. Processing continues with block 612.

At block 612, an opad is sent to the hash unit for use in processing an outer loop. Processing continues with block 614.

At block 614, the state machine 208 initiates the final padding and hash processing including the digest feedback mechanism involved in the hash processing of the outer loop of the nested hash by appropriate control of multiplexer 212 to allow the data stored in shared state 2 register 210 through to the hash data buffer 206. Processing continues with block 616.

At block 616, the shared state 2 register 210 is updated with the result of the outer loop. Processing continues with block 618.

At block 618, if there is another iteration, for example, there is another level in the n-level nested hash function as shown in Table 1, processing continues with block 610 to initialize the shared state 1 register 204. If not, processing is complete.

Typical "standard HMAC support function" implementations require pre-computed ipad and opad values. Such a design requires that the ipad and opad first be computed, the precomputed values are then used for subsequent HMAC processing. This requirement can introduce additional latency for processing, particularly in cases where the ipad and opad are not re-used from one packet to another. In an embodiment of the invention, the ipad and opad may be pre-computed and sent as discussed in blocks 602, 612 or may be computed as part of the data processing. Computing the ipad and opad as part of the data processing eliminates the extra latency in cases where these values are not re-used by subsequent packets (data sets or messages). In an embodiment, the raw data is XORed with a HMAC ipad constant or HMAC opad constant prior to sending to the hash data buffer 206 as post XOR data input 218.

An embodiment of the invention may be used for the SSL v3 protocol key-material generation function which is used to generate keys for an SSL session. The SSL v3 Key-Material Generation Function is similar to the SSLv3 MAC computation, but it has the additional requirement of the use of different hash algorithms for the inner and outer hash computations. Specifically, it requires a SHA-1 hash to be performed on the key data to generate an intermediate result. This is the 'inner hash function', with the result called the 'inner hash result'. Then, the inner hash result is pre-pended with additional key data, and an MD5 hash is performed. This is the 'outer hash function'/'outer hash result'. This process is repeated several times with different key data. The outer hash results are then concatenated to form the key material. The key material can be computed in the hash unit 106 in one sequence of commands without stalling the pipeline.

In an embodiment, the commands shown in Table 3 below are defined to perform the n-level nested function defined above in the hash unit 106 shown in FIG. 2:

TABLE 3

| | |
|---|---|
| Set_config: | Set the hash algorithm. |
| Set_state1: | Initialize the state1 register. |
| Set_counter: | Initialize a counter in the state machine used to count the amount of data that has been processed. |

TABLE 3-continued

| | |
|---|---|
| Slice_wr: | Send data for hash processing. |
| Slice_wr_ipad: | Send data XORed with HMAC IPAD constant for hash processing. |
| Slice_wr_opad: | Send data XORed with HMAC OPAD constant for hash processing. |
| Slice_final_inner: | Initiate final padding and hash processing of the inner loop of a nested hash. |
| Slice_final_outer: | Initiate the final padding and hash processing including digest feedback mechanism involved in the hash processing of the outer loop of a nested hash. |

In order to perform the n-level nested hash function defined above, the sequence of commands shown below in Table 4 may be used:

TABLE 4

For iterations 1 through n

```
Set_config (hash algorithm for inner)
Set_state1(default state for hash algorithm)
write (ipad)
write (data)
final_inner
if hash algorithm for outer is different than for inner
    Set_config (hash algorithm for outer)
    Set_state1 (default state for outer hash algorithm)
Write (opad_2)
Final_outer
```

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
   a hash unit to perform an inner loop hash function on a block of data for an inner loop of a nested hash to generate a first hash result;
   a first register to store the first hash result of the inner loop hash function, wherein the first hash result is used by a subsequent inner loop hash function;
   a second register to store the first hash result of the inner loop hash function, wherein the first hash result is used by a subsequent outer loop hash function; and
   a feedback path to forward the first hash result stored in the second register to the hash unit, wherein first hash result is used by the hash unit to perform an outer loop hash function.

2. The apparatus of claim 1, wherein the inner loop hash function and the outer loop hash function are the same.

3. The apparatus of claim 2, wherein the inner loop hash function and the outer loop hash function perform Message-Digest Algorithm 5 (MD5).

4. The apparatus of claim 2, wherein the inner loop hash function and the outer loop hash function perform Secure Hash Algorithm (SHA)-1.

5. The apparatus of claim 1, wherein the inner loop hash function and the outer loop hash function differ.

6. The apparatus of claim 5 wherein the inner loop hash function performs Message-Digest Algorithm 5 (MD5) and the outer loop hash function performs one of a plurality of Secure Hash Algorithms (SHA).

7. The apparatus of claim 1, wherein the block of data is raw data input.

8. The apparatus of claim 1, wherein the block of data is raw data input Exclusive ORed (XORed) with a constant value.

9. The apparatus of claim 8, wherein the constant value is 0x3c.

10. The apparatus of claim 8, wherein the constant value is 0x56.

11. A method comprising:
    performing an inner loop hash function on a block of data for an inner loop of a nested hash to generate a first hash result;
    storing first hash result of the inner loop hash function in a first register, wherein the first hash result is used by a subsequent inner loop hash function;
    storing the first hash result of the inner loop hash function in a second register, wherein the first hash result is used by a subsequent outer loop hash function; and
    forwarding the first hash result stored in the second register on a feedback path, wherein first hash result is used by the hash unit to perform an outer loop hash function.

12. The method of claim 11, wherein the inner loop hash function and the outer loop hash function are the same.

13. The method of claim 12, wherein the inner loop hash function and the outer loop hash function perform Message-Digest Algorithm 5 (MD5).

14. The method of claim 12, wherein the inner loop hash function and the outer loop hash function perform Secure Hash Algorithm (SHA)-1.

15. The method of claim 11, wherein the inner loop hash function and the outer loop hash function differ.

16. The method of claim 15 wherein the inner loop hash function performs Message-Digest Algorithm 5 (MD5) and the outer loop hash function performs one of a plurality of Secure Hash Algorithms (SHA).

17. The method of claim 11, wherein the block of data is raw data input.

18. The method of claim 11, wherein the block of data is raw data input Exclusive ORed (XORed) with a constant value.

19. A system comprising:
    a dynamic random access memory to store data and instructions; and
    a processor coupled to the memory to execute the instructions, the processor comprising:
    a hash unit to perform an inner loop hash function on a block of data for an inner loop of a nested hash to generate a first hash result;
    a first register to store first hash result of the inner loop hash function, wherein the first hash result is used by a subsequent inner loop hash function;
    a second register to store the first hash result of the inner loop hash function, wherein the first hash result is used by a subsequent outer loop hash function; and
    a feedback path to forward the first hash result stored in the second register to the hash unit, wherein first hash result is used by the hash unit to perform an outer loop hash function.

20. The system of claim 19 wherein the inner loop hash function performs Message-Digest Algorithm 5 (MD5) and the outer loop hash function performs one of a plurality of Secure Hash Algorithms (SHA).

* * * * *